(12) United States Patent
Maling

(10) Patent No.: US 7,703,914 B2
(45) Date of Patent: Apr. 27, 2010

(54) DURABLE EYEGLASS FRAME ASSEMBLY

(76) Inventor: Chris E. Maling, 11 Windsor Dr., Foxboro, MA (US) 02035

( * ) Notice: Subject to any disclaimer, the term of this patent is extended or adjusted under 35 U.S.C. 154(b) by 0 days.

(21) Appl. No.: 12/098,787

(22) Filed: Apr. 7, 2008

(65) Prior Publication Data

US 2008/0212016 A1      Sep. 4, 2008

Related U.S. Application Data

(60) Continuation of application No. 11/457,350, filed on Jul. 13, 2006, now Pat. No. 7,354,149, which is a division of application No. 10/874,279, filed on Jun. 24, 2004, now Pat. No. 7,101,039.

(51) Int. Cl.
*G02C 5/22* (2006.01)

(52) U.S. Cl. .......................... 351/153; 16/228

(58) Field of Classification Search ................. 351/153, 351/140, 158, 41, 116, 111; 16/228
See application file for complete search history.

(56) References Cited

U.S. PATENT DOCUMENTS

| | | | |
|---|---|---|---|
| 3,402,005 | A | 9/1968 | Liautaud et al. |
| 3,584,938 | A | 6/1971 | Lindblom |
| 3,762,804 | A | 10/1973 | Livas |
| 4,521,090 | A | 6/1985 | Pierquin |
| 4,826,309 | A | 5/1989 | VanNeste |
| 4,978,209 | A * | 12/1990 | Ohba .......................... 351/153 |
| 5,042,934 | A | 8/1991 | Nakanishi |
| 5,258,784 | A | 11/1993 | Baines |
| 5,418,581 | A | 5/1995 | Conway |
| 5,469,232 | A * | 11/1995 | Ichimura ..................... 351/111 |
| 5,596,789 | A | 1/1997 | Simioni |
| 5,684,559 | A | 11/1997 | Lin |
| 5,739,892 | A | 4/1998 | Kobayashi |
| 5,748,281 | A | 5/1998 | Simioni et al. |
| 5,760,866 | A | 6/1998 | Wedeck et al. |
| 5,818,566 | A | 10/1998 | Carlon et al. |
| 5,844,655 | A | 12/1998 | Chang |
| 5,847,801 | A | 12/1998 | Masunaga |
| 5,914,767 | A | 6/1999 | Wedeck et al. |
| 5,980,039 | A | 11/1999 | Schmid et al. |
| 6,070,978 | A | 6/2000 | Temming |
| 6,145,985 | A | 11/2000 | DeMarchi et al. |
| 6,193,368 | B1 | 2/2001 | George |
| 6,231,181 | B1 * | 5/2001 | Swab .......................... 351/116 |

(Continued)

FOREIGN PATENT DOCUMENTS

CN      2284966 Y      6/1998

(Continued)

OTHER PUBLICATIONS

International Search Report issued in PCT/US05/21109 (WO 2006/012005) mailed on Mar. 7, 2006.

(Continued)

*Primary Examiner*—Hung X Dang
(74) *Attorney, Agent, or Firm*—Modern Times Legal; Robert J. Sayre

(57) ABSTRACT

A novel eyeglasses frame allowing sizing, assembly and disassembly without the need for special training, screws, bolts, or pins, or special tools.

20 Claims, 14 Drawing Sheets

U.S. PATENT DOCUMENTS

| | | |
|---|---|---|
| 6,276,796 B1 | 8/2001 | Lindberg et al. |
| 6,328,444 B2 | 12/2001 | Hagiwara |
| 6,334,679 B2 | 1/2002 | Masunaga et al. |
| 6,338,556 B1 | 1/2002 | Kamiya |
| 6,511,174 B1 | 1/2003 | Rossin |
| 6,523,952 B1 | 2/2003 | Krumme |
| 6,711,779 B1 | 3/2004 | Fuchs et al. |
| 6,755,522 B1 | 6/2004 | Strenk |
| 6,767,096 B2 | 7/2004 | Hiramoto |
| 6,843,561 B2 | 1/2005 | Krumme |
| 6,857,738 B1 | 2/2005 | Bove et al. |
| 7,131,726 B2 | 11/2006 | Hiramoto |

FOREIGN PATENT DOCUMENTS

| | | |
|---|---|---|
| CN | 2492864 Y | 5/2002 |
| CN | 2507031 Y | 8/2002 |
| DE | 42 14 531 A1 | 11/1993 |
| DE | 197 03 812 A1 | 7/1998 |
| DE | 199 56 328 A1 | 6/2001 |

OTHER PUBLICATIONS

Supplementary European Search Report issued in EP 05761689.8 dated Jul. 29, 2008.

State Intellectual Property Office (China), Office Action in CN 200580028530.6 (Feb. 9, 2009) (English-language translation).

* cited by examiner

DURABLE EYEGLASS FRAME ASSEMBLY

FIELD OF THE INVENTION

This application is a continuation of U.S. patent application Ser. No. 11/457,350, filed Jul. 13, 2006, now U.S. Pat. No. 7,354,149 which is a divisional of U.S. patent application Ser. No. 10/874,279, filed Jun. 24, 2004, now U.S. Pat. No. 7,101,039.

The present invention relates to eyeglasses frames, which do not require screws, bolts, or pins, and which are easily assembled and disassembled without the need for special tools.

BACKGROUND OF THE INVENTION

In recent years, numerous improvements have been made in eyewear design and production, which have produced increasingly lightweight, comfortable, and attractive products. However, these product improvements have exposed a number of problems with traditional eyewear designs. First, many eyewear products are very delicate, have multiple small components, and require sophisticated tools or custom parts for repair or assembly. Second, the delicate components inevitably break after extended use, and the repairs are time consuming, expensive, or inconvenient for the user. Third, for a given set of eyeglasses frames, it is often difficult, expensive, or impossible to customize the eyeglasses for a given user. In addition, repairs to damaged eyeglasses can often not be made by the end user, necessitating a visit to an optician. The present invention can provide a solution to at least one of these problems.

A major problem with many eyeglasses designs is the need for multiple fasteners such as screws, pins, or small bolts. These fasteners may be located at hinge points between the eyeglasses temple arm and temple arm hinge block or at various positions on the eyeglasses rim. In some cases, multiple fastener types or sizes are used on the same pair of eyeglasses. Furthermore, these fasteners are often not easily replaced through a vender's stock and often require custom orders to make repairs.

Fasteners may be used both on eyeglasses rims and eyeglasses hinges. When used on eyeglasses rims, the fasteners may help secure a lens in place, connect the rim to another portion of the eyeglass, or hold multi-component parts together. In any case, the fastener, whether it be a screw, pin, or bolt design, is subject to back-out after extended wear. When this occurs, the fastener will often be lost, and the product will be rendered useless until a repair is made.

Fasteners are also used for eyeglasses hinges, for which numerous designs exist. Some designs require threaded fasteners such as screws or small bolts. Others require threadless fasteners such as pins. Some designs also employ an adhesive, washers, or friction-fit materials. Regardless, with all of these hinge designs, the screw, bolt, or pin risks backing out of the socket in the hinge or other frame section, rendering the eyeglasses unwearable and potentially requiring the purchase of new parts, the use of special tools, or a consultation with an optician to make repairs.

Another problem with eyeglasses hinges is that they are sometimes subject to relatively severe stress due to accidental or intentional misuse. Traditional eyeglasses hinges will often break or become distorted under sufficient stress. Broken eyeglasses cannot be worn, and distorted eyeglasses may fit improperly. With most current designs, repairs may require significant training, the purchase of replacement parts, or the use of unsightly materials such as tape or glue.

Yet another problem with current eyeglasses designs pertains to the temple arm ear piece. The temple arm ear piece comes in one length for a given set of frames. Although consumers often need shorter or longer temple arm lengths, this part is rarely stocked and must be special ordered by a vendor. This process is time-consuming if the appropriate piece is available at all. Most temple arms on frames are not universal, are typically left and right-sided, and cannot be switched with other frame styles. The earpiece sock or paddle is not designed to be removed once applied by the manufacturer. In the event that the paddle is lost or breaks, replacing it is very difficult. Paddle styles are often custom items designed for only one temple arm style, color, and size; and manufacturers do not often use paddle part numbers for reordering. Most provide complete frames only for replacement.

SUMMARY OF THE INVENTION

Advantageously, the present invention provides a novel eyeglasses frame for securely holding a lens without the need for screws, pins, or bolts.

The present invention further advantageously provides a novel eyeglasses frame for which a temple arm of the frame is removably attached to a temple arm hinge block without the need for screws, pins, or bolts.

Further advantageously, the present invention provides a novel eyeglasses frame for which the temple arm of the frame can be easily attached to the temple arm hinge block without the need for special tools, replacement parts, or training if the temple arm of the frame becomes separated from the temple arm hinge block either intentionally or unintentionally.

Another advantage of the present invention is that eyeglasses frames constructed in accordance herewith can be, contrary to the prior art, more durable, less likely to be permanently damaged, and can be easily repaired without special tools, replacement parts, or training.

Another advantage of the present invention is that eyeglasses frames constructed in accordance herewith can be, contrary to the prior art, more durable, less likely to be permanently damaged, and can be easily repaired by an untrained end user.

A further advantage of the present invention is that the temple arm length of the eyeglasses can be shortened by removing excess length, again without the use of special tools.

Another advantage of the present invention is that the temple arm paddle or sock can be used with temple arms of more than one length.

Additional objects and advantages of the invention will be set forth in part in the description which follows, and in part will be obvious from the description, or may be learned by practice of the invention. The objects and advantages of the invention can be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
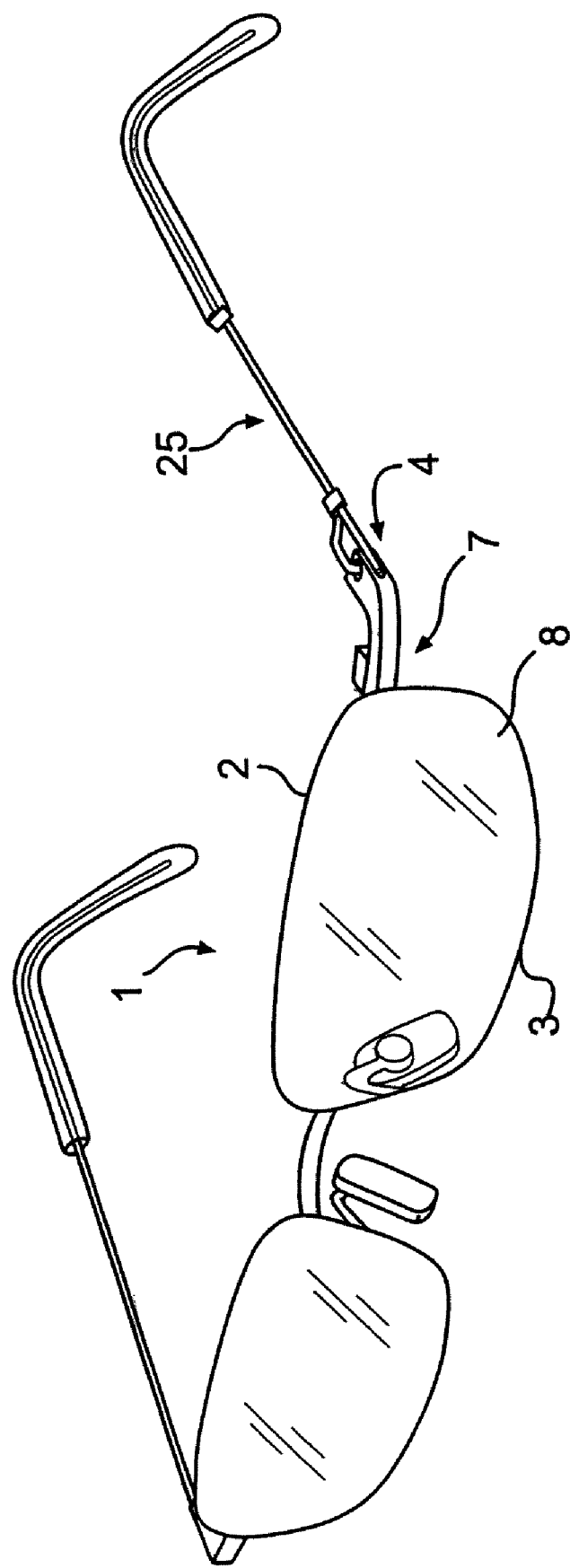
FIG. 1 illustrates a pair of eyeglasses including the rim (1) and temple arm (25) of the present invention.
Figure 2:
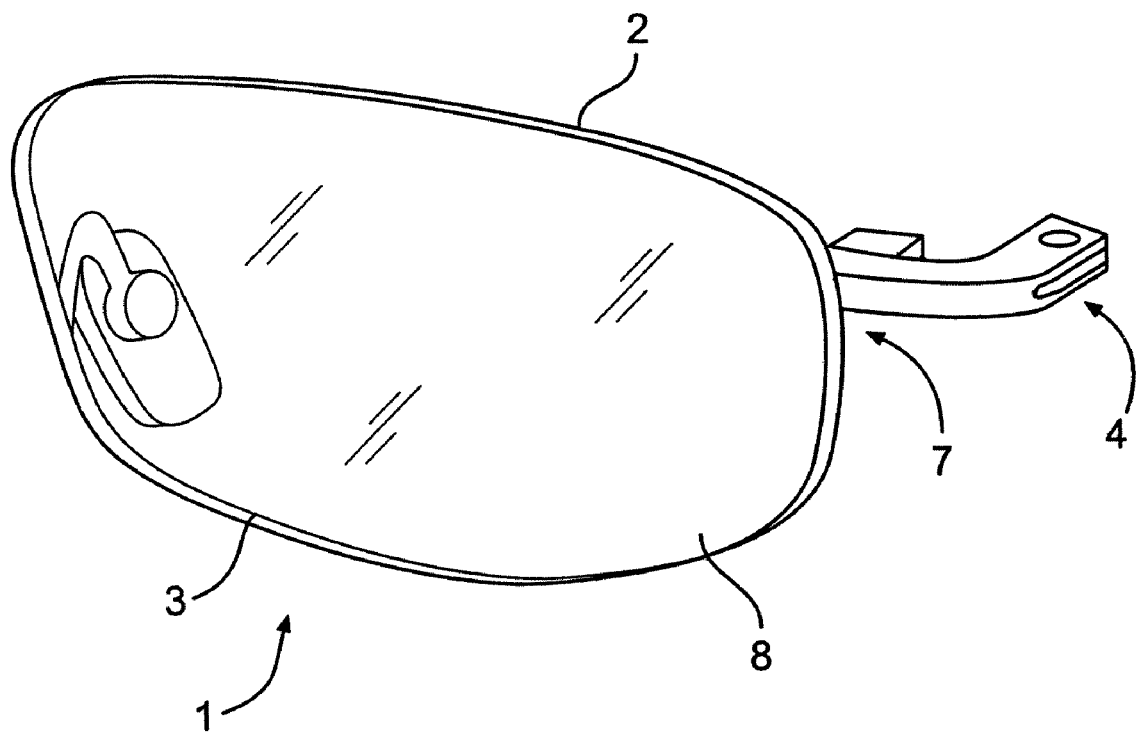
FIG. 2 is a perspective view of rim (1) of the present invention.

Reference will now be made in detail to the present embodiments of the invention, examples of which are illustrated in the accompanying drawings. Wherever possible, the same reference numbers will be used throughout the drawings to refer to the same or like parts.

The term "eyeglasses" refers to entire eyeglasses including the lenses, frames, and temple arms. Naturally, the present invention applies equally well to prescription eyeglasses for use in correction of vision as well as sunglasses, protective eyeglasses, or combinations of sunglasses, prescription eyewear or protective eyewear.

The term "frames" will refer to the entire "eyeglasses" except for the lenses, i.e., the rim or other lens retaining structure, temple arms, nose pieces, or earpiece paddles. It is envisioned that the frames may be fabricated from any type of material known to be useful for producing eyeglasses frames. Examples of materials used for eyeglasses frames include metals such as titanium, stainless steel, Monel, beryllium, nitinol, Ticral, Flexon, aluminum, silver, gold; or nonmetallic materials such as plastics, elastomers, rubber, wood, leather, or precious stones. Combinations of materials may also be used for various parts of the frames or as alloys, composites, or copolymers. Further, any type of lens may be used in combination with the present invention.

Advantageously, the present invention provides a novel eyeglasses rim for securely holding a lens without the need for screws, pins, or bolts. In an illustrative embodiment as shown in FIGS. 1-8, the present invention includes a rim (1) for eyeglasses comprising an upper portion of an eyewire (2) and a lower portion of an eyewire (3), a temple arm hinge block (4), and a joining mechanism (7). The joining mechanism (7) is adjacent to the temple arm hinge block (4), for joining the upper portion of an eyewire (2) and lower portion of an eyewire (3) and includes a tension clip (5, 5', 5") located on either the upper portion of an eyewire (2) or the lower portion of an eyewire (3). A tension clip receiver (6, 6', 6") is located on the other of the upper portion of an eyewire (2) or lower portion of an eyewire (3), so that the tension clip (5, 5', 5") may be inserted into the tension clip receiver (6, 6', 6") to join the upper portion of an eyewire (2) and lower portion of an eyewire (3) and securely maintain an eyeglasses lens (8) within the rim (1).

Figure 3:
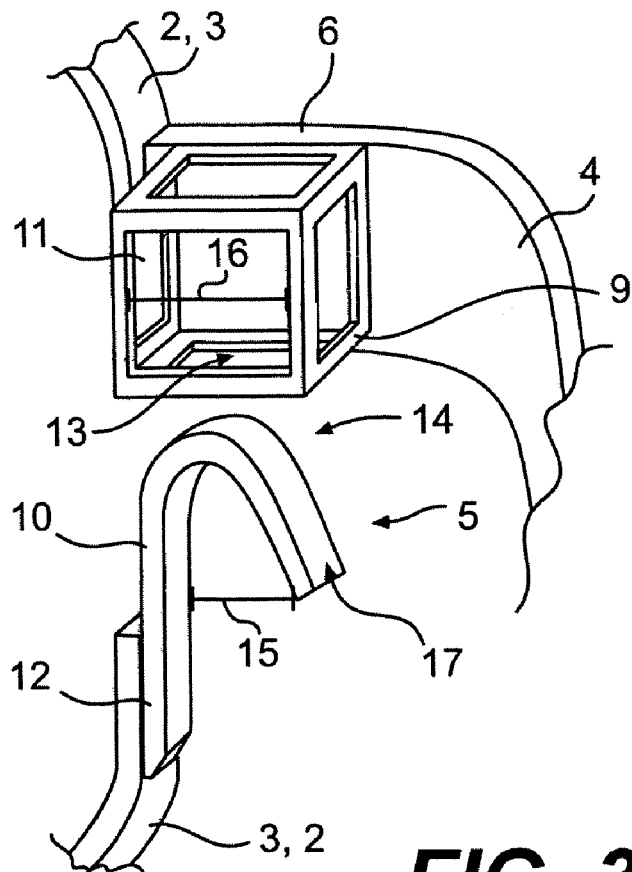
FIG. 3 illustrates a tension clip (5) and tension clip receiver (6) before joining an upper portion of an eyewire (2) and lower portion of an eyewire (3) according to the present invention.
Figure 4:
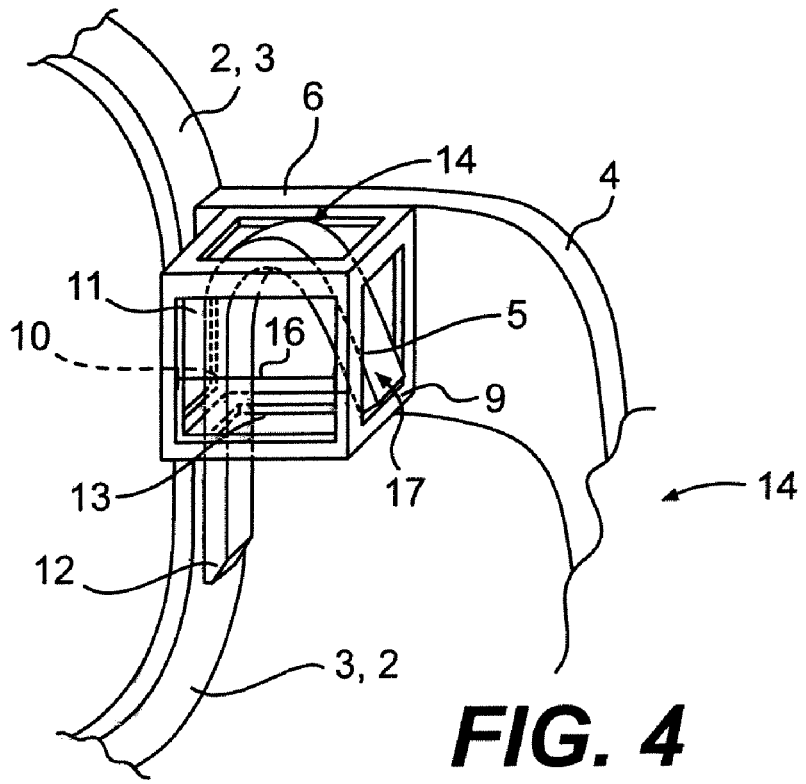
FIG. 4 illustrates a tension clip (5) and tension clip receiver (6) of FIG. 3 after joining an upper portion of an eyewire (2) and lower a portion of an eyewire (3) according to the present invention.

In one embodiment, the tension clip (5) and tension clip receiver (6) are illustrated in FIGS. 3-4. In this embodiment, the tension clip (5) is permanently attached to a joining region (12) of the lower portion of an eyewire (3) along a length of the tension clip (5) and the lower portion of an eyewire (3). The attachment at the joining region (12) may be formed by chemical or mechanical bonding. Applicable bonding processes include welding, gluing, or generating a chemical reaction that causes the tension clip (5) to be bonded to the lower portion of an eyewire (3). The tension clip (5) and lower portion of an eyewire (3) may also be formed as a single component by processes such as conventional metal forming or injection molding.

In the embodiments illustrated in FIGS. 3-4, the tension clip (5) can have a hook or U-shape with a first section (10) and a second section (17) as well as an end section (14). The end section (14) is inserted into an opening (13) in the tension clip receiver (6). Before insertion, the tension clip width (15) is equal to or larger than the tension clip receiver width (16). Upon insertion of the tension clip (5) into the tension clip receiver (6) the tension clip (5) compresses so that the width (15) decreases enough to fit within the opening (13) in the tension clip receiver (6). When the tension clip (5) has been inserted completely into the tension clip receiver (6), the tension clip (5) expands to the tension clip receiver width (16) and the first section (10) abuts a portion of a terminal portion (11) of the upper portion of an eyewire (2), and the second section (17) makes contact with a locking region (9) of the tension clip receiver (6) to securely join the upper portion of an eyewire (2) and lower portion of an eyewire (3). In this manner, a lens (8) located between the upper portion of an eyewire (2) and lower portion of an eyewire (3) will be held in place. Furthermore, the lens (8) can be released from the rim (1) by compressing the tension clip (5) and removing the tension clip (5) from the tension clip receiver (6). Where shape memory alloys are employed, such as nitinol for example, the expansion and compression of the tension clip (5) can occur by harnessing shape memory or pseudo-elastic properties.

Figure 5:
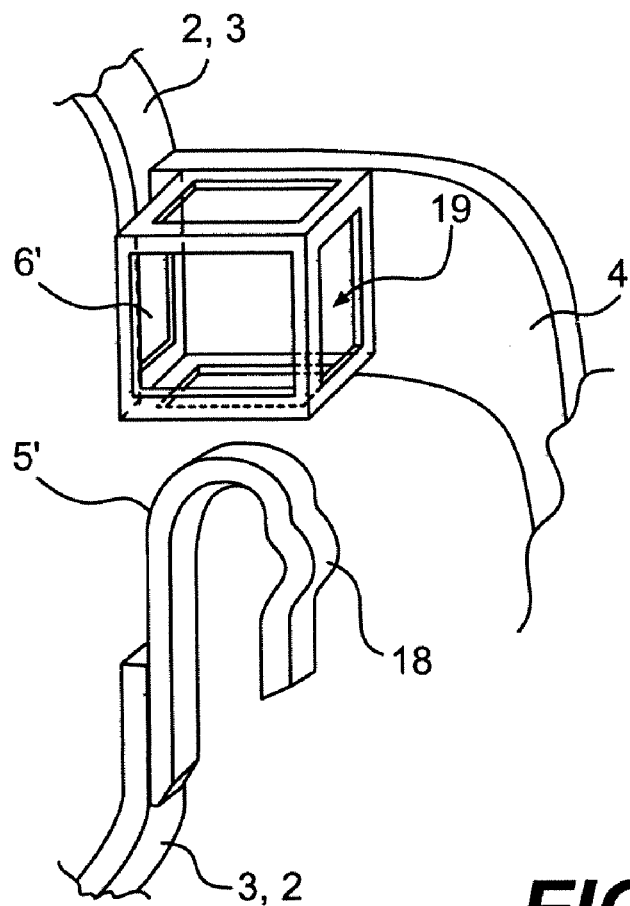
FIG. 5 illustrates an alternative embodiment of a tension clip (5') and tension clip receiver (6') before joining an upper portion of an eyewire (2) and lower portion of an eyewire (3) according to the present invention.
Figure 6:
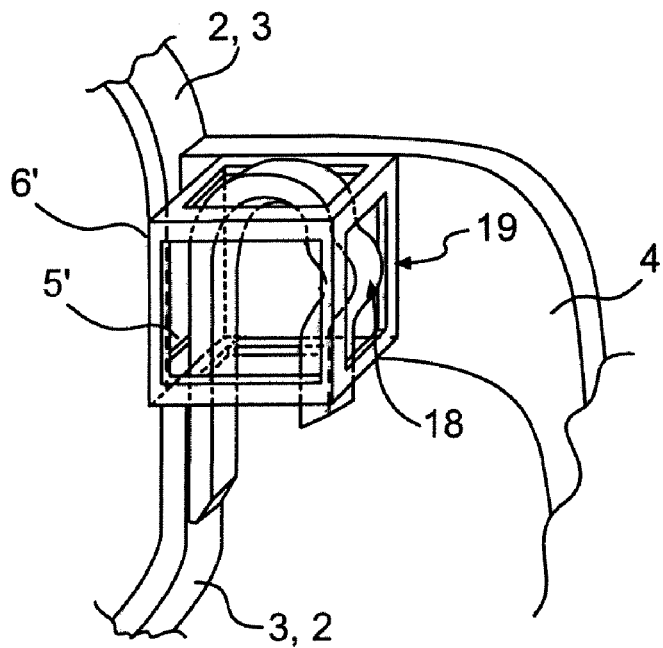
FIG. 6 illustrates the tension clip (5') and tension clip receiver (6') of FIG. 5 after joining an upper portion of an eyewire (2) and lower portion of an eyewire (3) according to the present invention.

Various other embodiments for the tension clip (5') and tension clip receiver (6') are illustrated in FIGS. 5-6. In FIGS. 5 and 6, the tension clip (5') contains a protrusion (18) which securely engages a lateral opening (19) in the tension clip receiver (6'). The engagement of the protrusion (18) and the lateral opening (19) locks the tension clip (5') in the tension clip receiver (6') as illustrated in FIG. 6.

Figure 7:
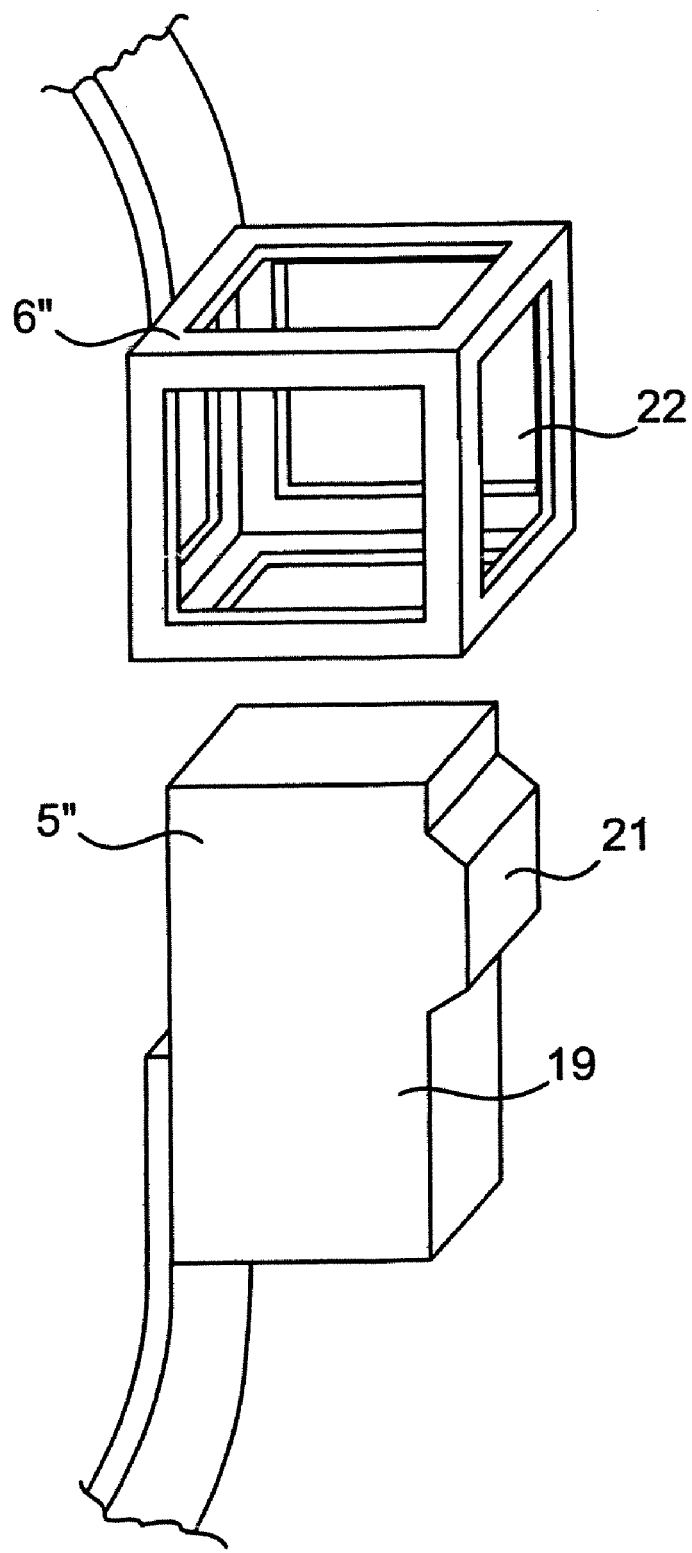
FIGS. 7-8 illustrate additional embodiments for a tension clip (5") and tension clip receiver (6").
Figure 8:
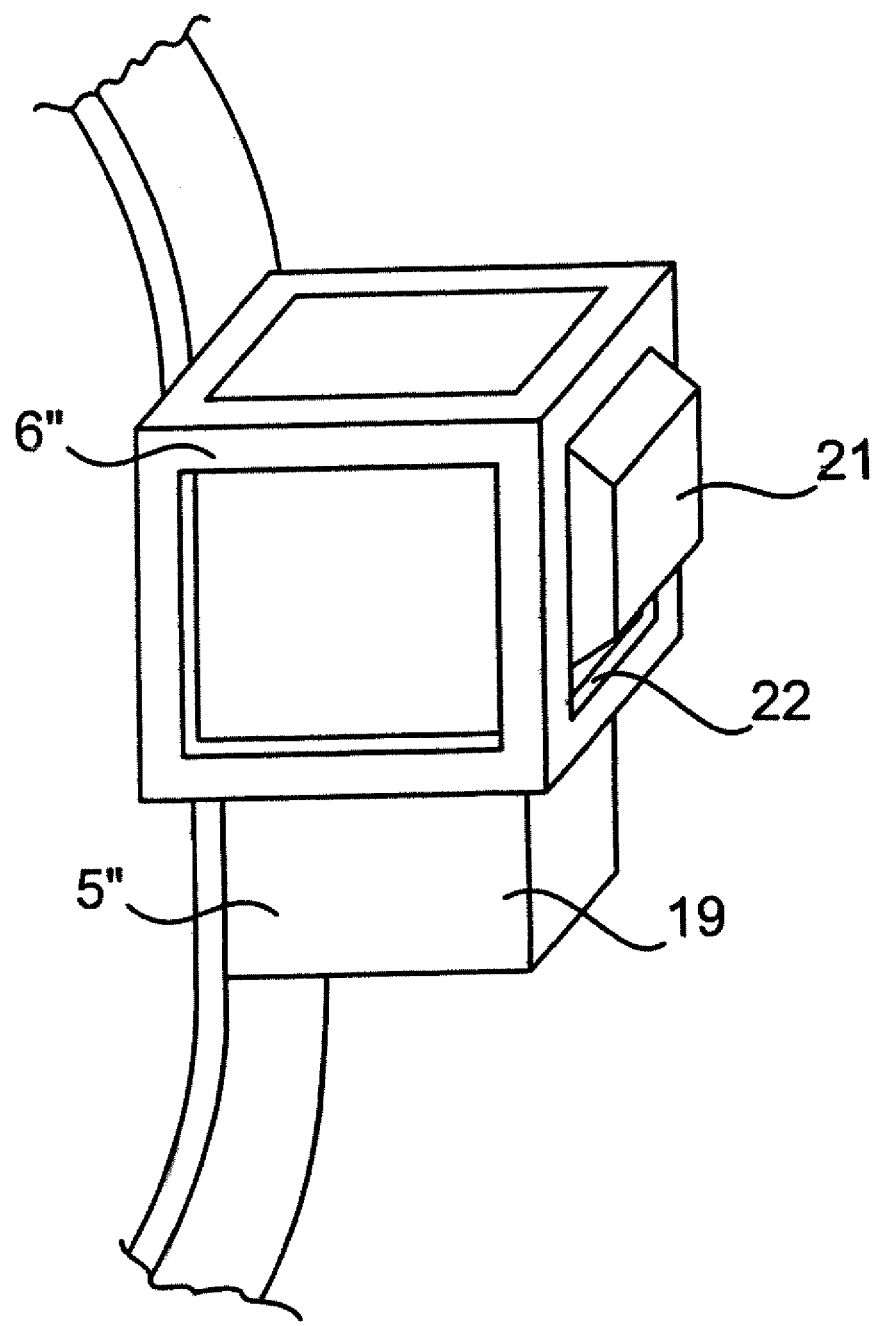

Various other embodiments for the tension clip (5") and tension clip receiver (6") are illustrated in FIGS. 7-8. The tension clip (5") is not a hook or U shape but is a substantially solid shape (19) with a lateral protrusion (21). As in FIGS. 5-6, the lateral protrusion (21) of the box (19) fits into a lateral opening (22) of a tension clip receiver (6").

In any of the above embodiments, the tension clip (5, 5', 5") can be more resilient than the tension clip receiver (6, 6', 6"), such that the tension clip (5, 5',5") flexes during assembly. The tension clip receiver (6, 6', 6"), however, can also be more flexible, such that the receiver (6, 6', 6") flexes during assembly. Of course, both parts may exhibit some degree of flexibility.

Another advantage of the present invention is that the temple arm (25) of the frame can be easily attached to the temple arm hinge block (4) without the need for special tools, replacement parts, or training if the temple arm (25) becomes separated from the temple arm hinge block (4) either intentionally or unintentionally.

Figure 9:
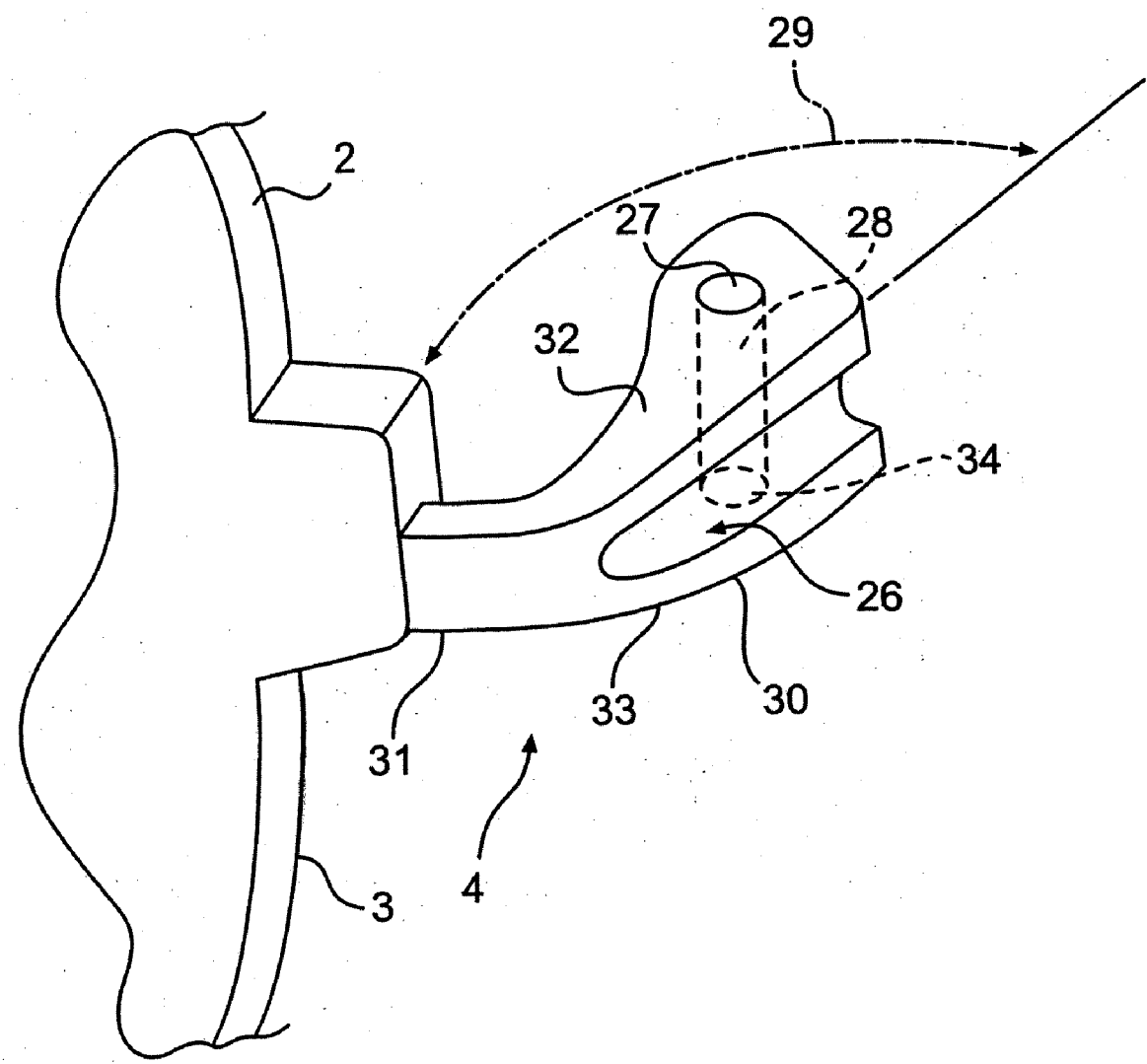
FIG. 9 illustrates a temple arm hinge block (4) according to the present invention.
Figure 10:
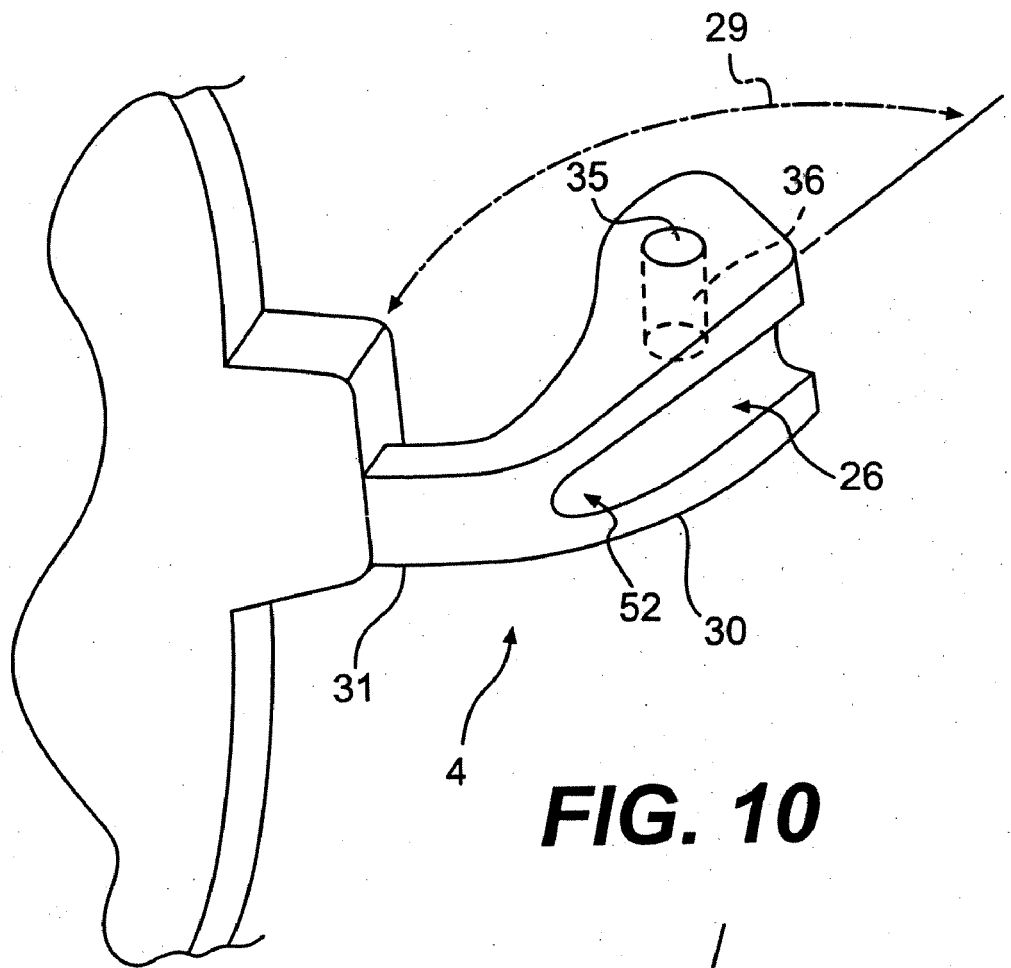
FIG. 10 illustrates another embodiment of a temple arm hinge block (4) according to the present invention.

FIGS. 9-13 illustrate embodiments of the temple arm (25) and temple arm hinge block (4) according to the present invention. The temple arm (25) and temple arm hinge block (4) may be used with full-wire eyeglasses frames, half-wire or semi-rimless eyeglasses frames, or three-piece mount or rimless eyeglasses frames. FIG. 9 illustrates a temple arm hinge block (4). The temple arm hinge block (4) includes a first hinge block section (30) and a second hinge block section (31). The second hinge block section (31) is attached to the eyeglasses upper portion of an eyewire (2) or lower portion of an eyewire (3). In the case of a rimless eyeglasses frame, the temple arm hinge block (4) may be attached directly to the eyeglass lens (8). An obtuse angle (29) between the first hinge block section (30) and second hinge block section (31) ranges approximately from about 100° to about 130°. The temple arm hinge block (4) has a shallow groove (26) located on one side of the first hinge block section (30). The first hinge block section (30) also has a top face (32) and a bottom face (33). A first circular opening (27) is located on the top face (32), and a second circular opening (34) is located on the bottom face (33). A cylindrical bore (28) connects the first circular opening (27) and the second circular opening (34). In another embodiment, which is illustrated in FIG. 10, there may be only one circular opening (35) and a cylindrical bore (36) may extend only part of the way through the first hinge block section (30).

Figure 11:
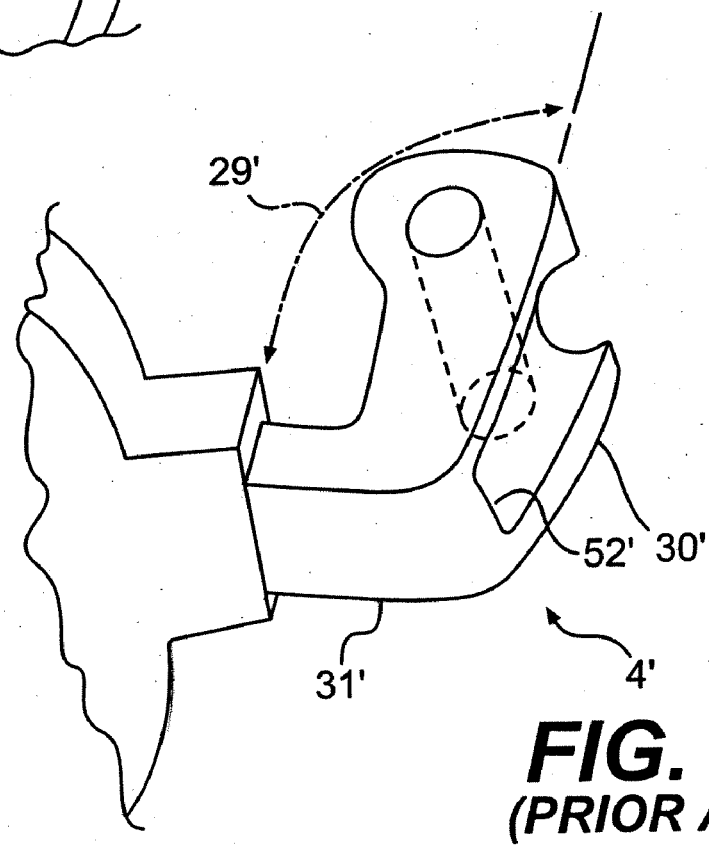
FIG. 11 illustrates a temple arm hinge block (4') according to the prior art.
Figure 12:
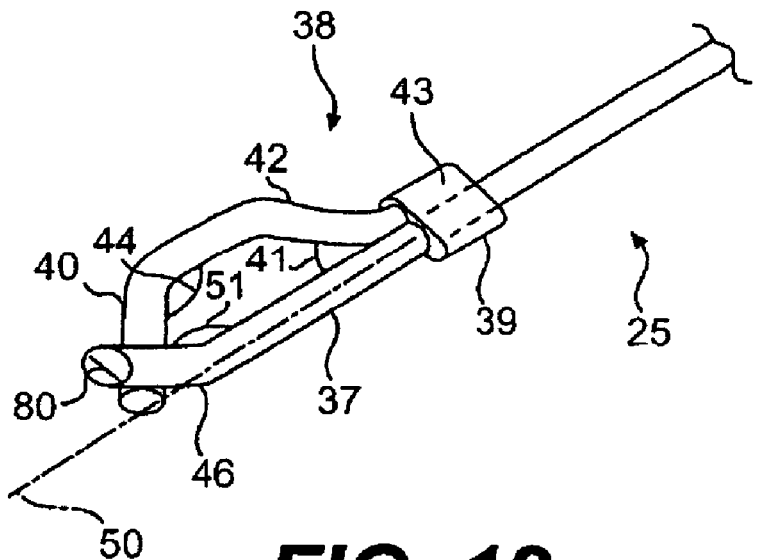
FIG. 12 illustrates a temple arm (25) according to the present invention.
Figure 13:
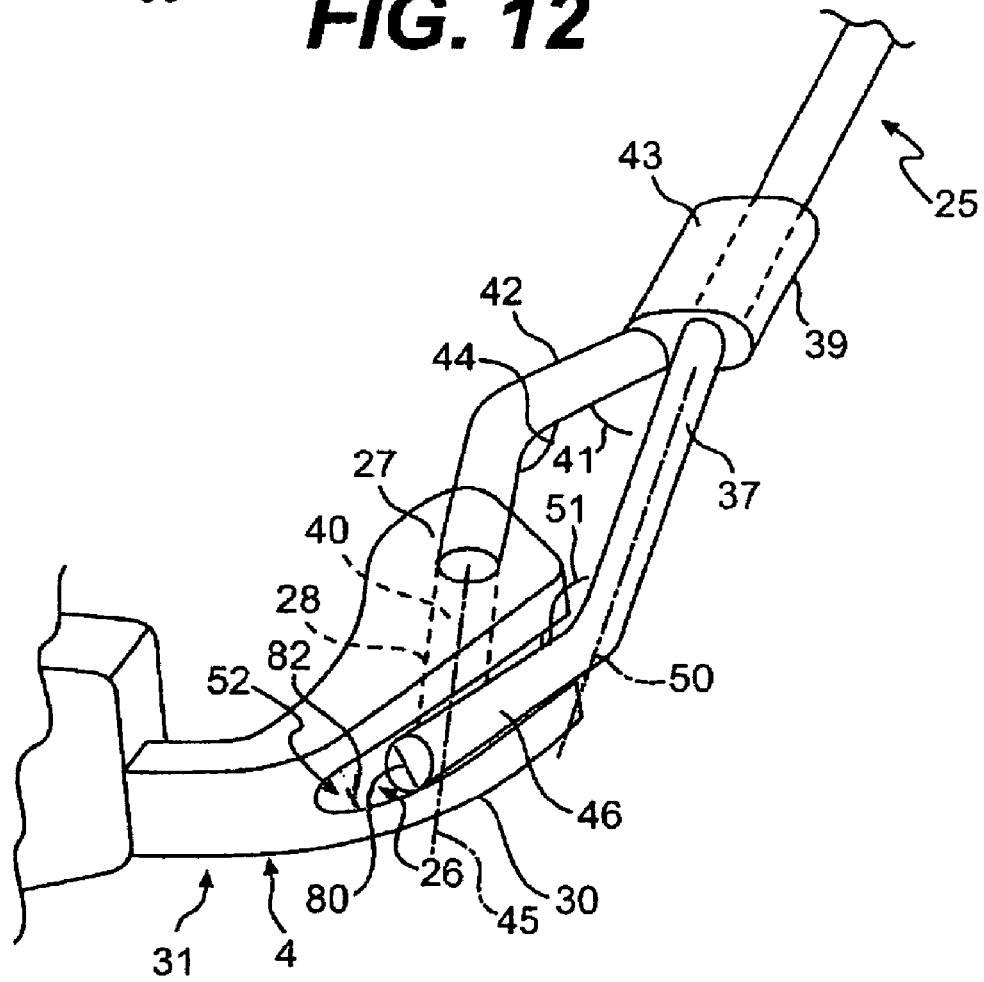
FIG. 13 illustrates a temple arm (25) attached to a temple arm hinge block (4) according to the present invention.
Figure 14:
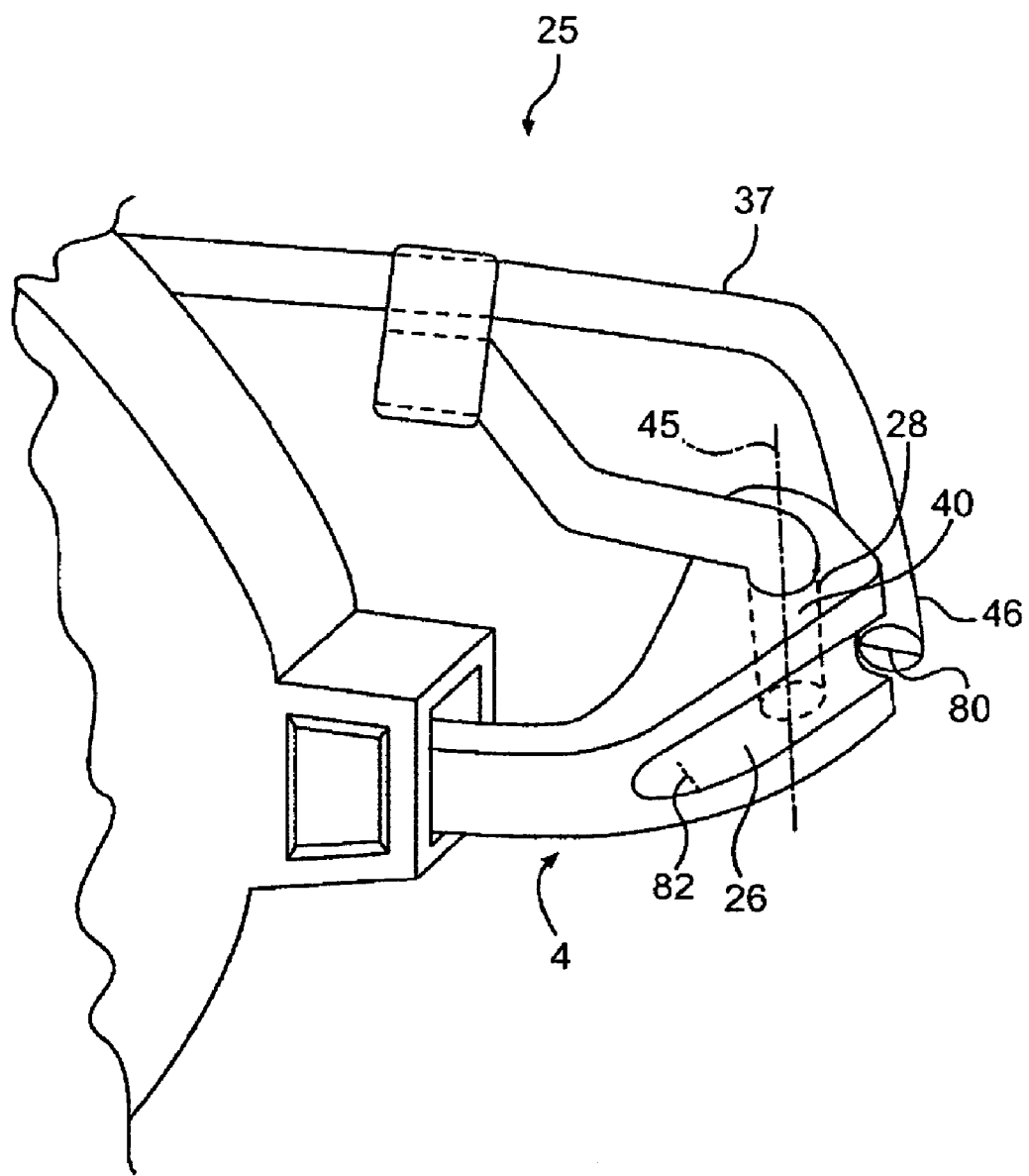
FIG. 14 illustrates a temple arm (25) rotated to a closed position in a temple arm hinge block (4).

FIG. 11 illustrates a similar temple hinge block (4'), which is known in the prior art. The present invention provides several advantages over this invention. First, the obtuse angle (29) between the first hinge block section (30) and second hinge block section (31) is approximately 100° and 130° as shown in FIGS. 9-10. The angle (29') between the first hinge block section (30') and (31'), as shown in the prior art, is always approximately 90°. Second, the groove (26) of the present invention is shallow, having a depth (82) less than the diameter (80) of a temple elongated section (37), as shown in FIGS. 12-14. Third, the groove (26) has a chamfered and beveled or sloped forward edge (52), whereas the prior art forward edge (52') is blunted. The combination in the present invention of the obtuse angle (29), the shallow groove (26) and the sloped forward edge (52) provides an advantage by reducing stress on the eyeglasses with excessive outward flexion of the temple (25) and by allowing the temple (25) to be more easily removed from the temple hinge block (4) with the application of sufficient accidental or intentional stress without damaging the eyeglasses. The structure of the prior art does not allow for this important advantage.

FIG. 12 illustrates a temple arm (25) according to the present invention. The temple arm (25) has an elongated section (37), a temple arm hinge (38) and a hinge connecting joint (39). The temple arm hinge (38) has a hinge block connector section (40), a middle section (42) and a temple arm connector region (43). The temple arm hinge (38) is connected to the elongated section (37) by a hinge connecting joint (39). The middle section (42) extends away from the elongated section (37) at an first angle (41). The hinge connecting joint (39) flexes to allow the first angle (41) to increase or decrease without damaging the eyeglasses frame. The hinge block connector section (40) forms an second angle (44) with the middle section (42) which is approximately 90°. The elongated section (37) has a first end (46) which is angled with respect to the main axis (50) of the elongated section (37).

FIGS. 13-14 illustrate a temple arm (25) connected to a temple arm hinge block (4). FIG. 13 illustrates the temple arm (25) connected to a temple arm hinge block (4) with the temple arm (25) in an open position as it would be if a person was wearing the eyeglasses. In the open position, the first end (46) of elongated section (37) of the temple arm (25) rests in the groove (26) on the side of the temple arm hinge block (4). An elongated section bend (51) allows the first end (46) of the elongated section (37) to fit snugly within the groove (26). The hinge block connector (40) is pivotably positioned within the bore (28) of the temple arm hinge block (4) through the first circular opening (27).

FIG. 14 illustrates the temple arm (25) connected to a temple arm hinge block (4) with the temple arm (25) in a closed position as it may be if the eyeglasses were not being worn. The first end (46) of the elongated section (37) is not in the groove (26), the hinge block connector (40) is in the bore (28), and the temple arm (25) is pivoted around the axis (45) created by the hinge block connector (40) and the bore (28). In the closed position, the position of the first end (46) of the elongated section (37) out of the groove (26) helps maintain the closed position to protect the glasses while in storage or while being carried.

Figure 15:
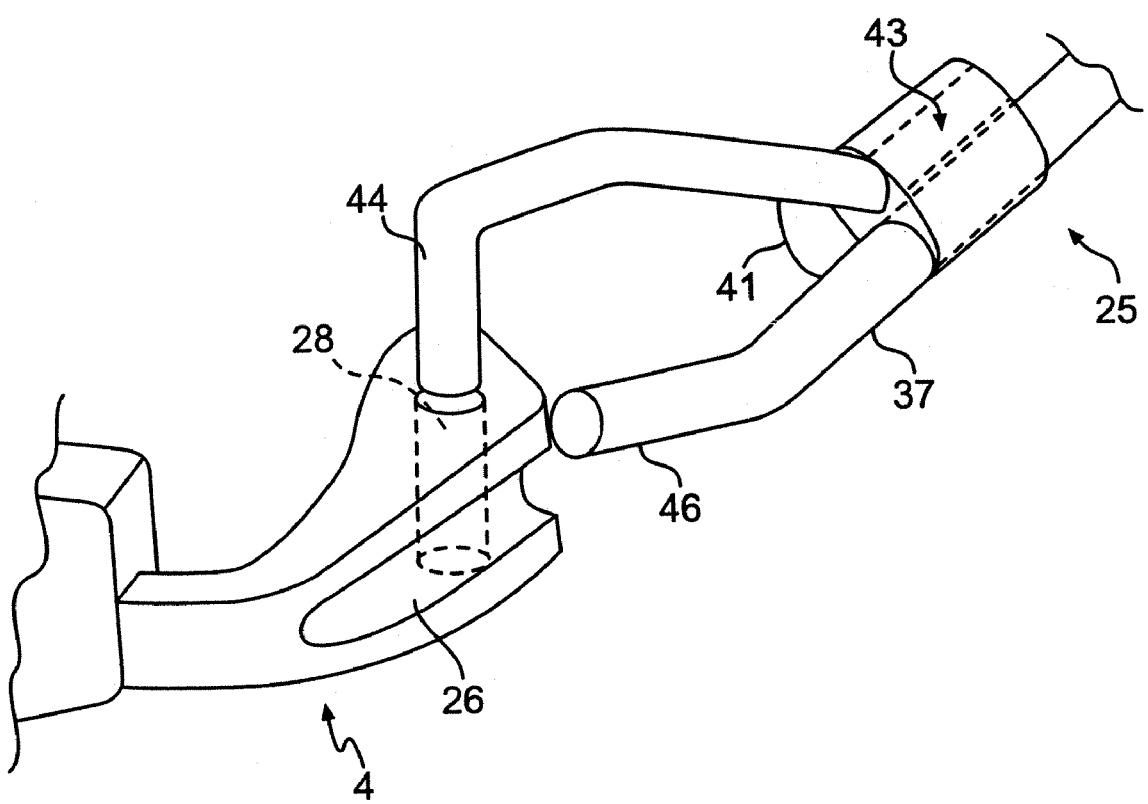
FIG. 15 illustrates a temple arm (25) being removed from a temple arm hinge block (4) without the use of tools and without damaging the eyeglasses.

FIG. 15 illustrates a temple arm (25) being removed from a temple arm hinge block (4). The angle (41) is increased by extension of the hinge connecting joint (43). The elongated section (37) moves out of the groove (26), and the hinge block connector (40) slides out of the bore (28) to remove the temple arm (25) from the temple arm hinge block (4).

Figure 16:
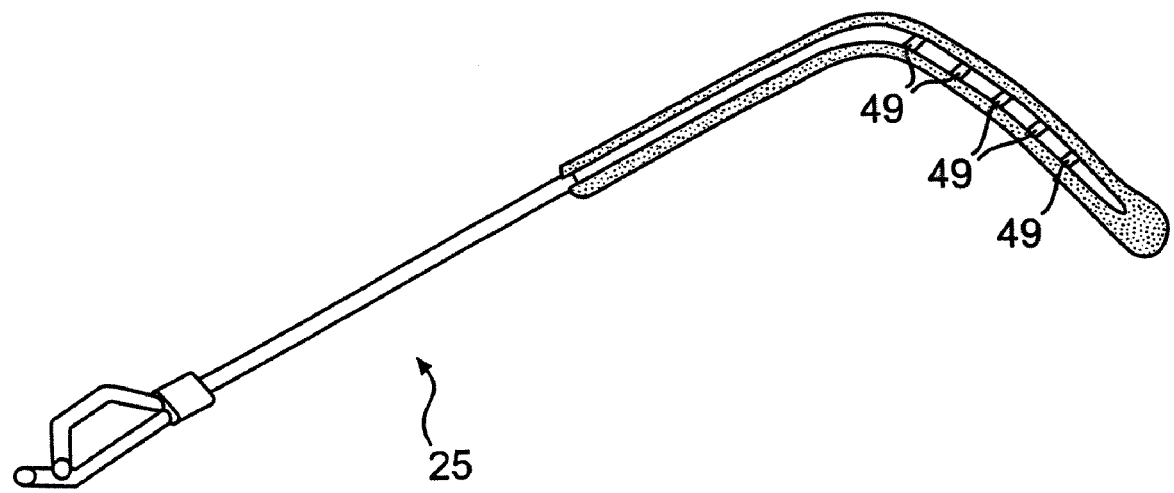
FIG. 16 illustrates a temple arm (25) with notches (49) which can be cut to shorten the temple arm.

FIG. 16 illustrates an eyeglasses temple arm (25) with indicia such as notches (49) which may be cut to alter the temple arm length. Scoring may also be employed allowing the temple arm (25) to be cleanly broken to length. The indicia may also be at least one printed markings. A design may include any number of notches (49), but a preferred number will be between 2 and 20 graduated notches (49), which may be equally spaced or spaced by other relevant considerations, such as statistical anthropometry. In typical cases, between 2 and 6 graduated notches (49) will be used. The temple arm (25) material can be thinner at the notches (49) to provide for easier cutting and sizing of multiple temple arms equally.

Figure 17:
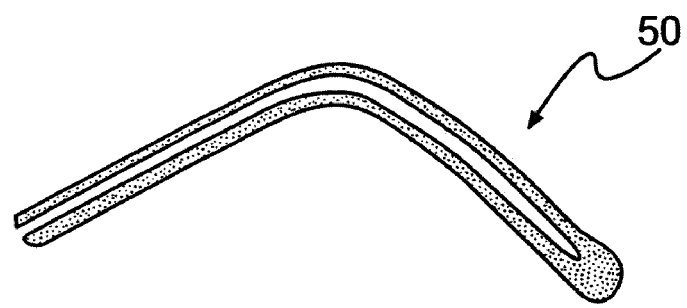
FIG. 17 illustrates a temple arm paddle (50) which can be used with a variety of temple arm lengths.
Figure 18:
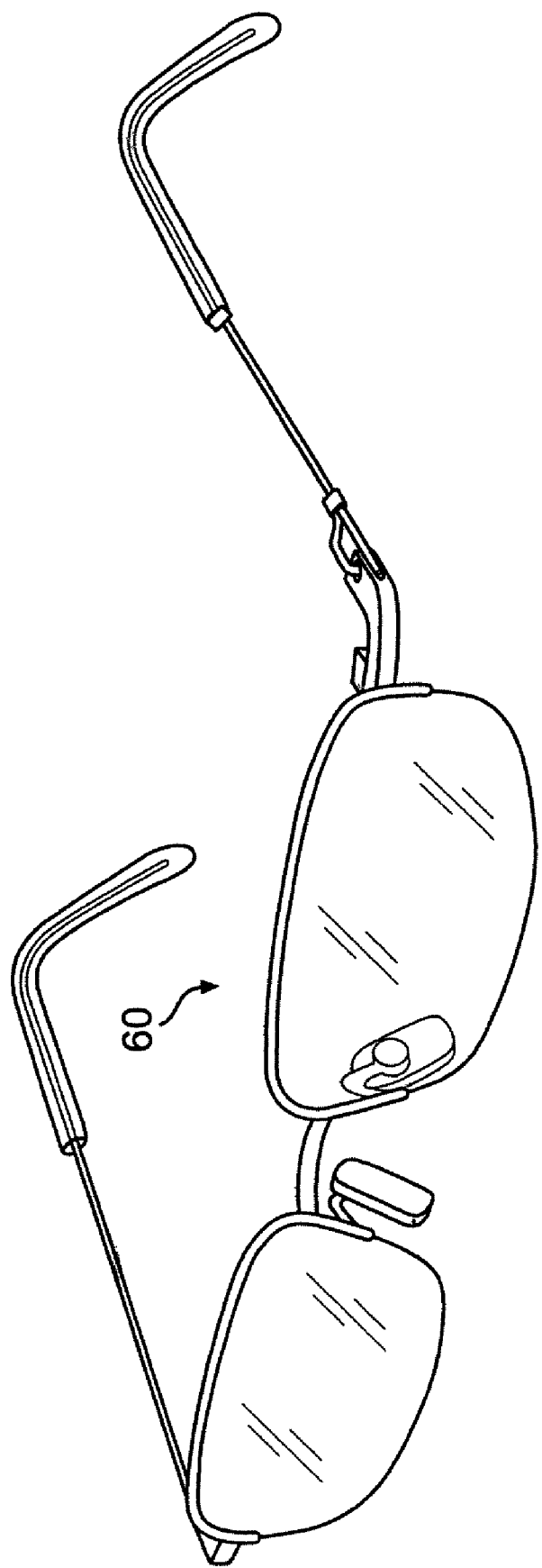
FIG. 18 illustrates a pair of eyeglasses (60) including half-wire eyeglasses frames.
Figure 19:
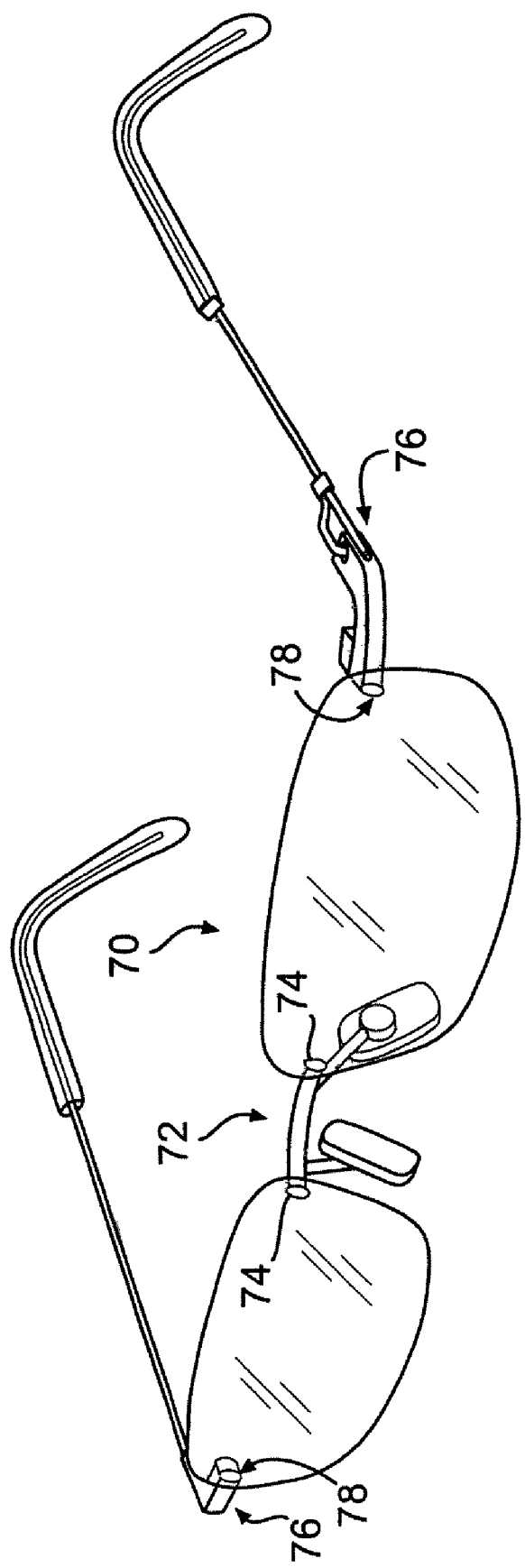
FIG. 19 illustrates a pair of eyeglasses (70) including three-piece mount eyeglasses frames.

FIG. 17 illustrates a temple arm paddle (50) which can be used with a variety of temple arm lengths. After the temple arm (25) is adjusted to the desired length, the paddle (50) is fitted onto the temple arm (25). The paddle (50) itself can be cut or otherwise shaped for proper fit on the temple arm (25), or for wearer comfort.

The temple arm (25) and temple arm hinge block (4) of the present invention may be used with any eyeglasses frame type. The indicia on the temple arm (25) and temple arm paddle (50) of the present invention may also be used with any eyeglasses frame type. Examples of various types of eyeglasses frames, which may be used, are full-wire eyeglasses frames, half-wire eyeglasses frames, and triple-mount rimless eyeglasses frames.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for disassembling eyeglasses comprising the steps of:
    providing eyeglasses having a temple arm hinge block connected to a temple arm, wherein a first end of the temple arm is positioned on a retaining surface of the temple arm hinge block, and wherein a portion of the second end of the temple arm is positioned within a bore of the temple arm hinge block to form a pivotable coupling between the temple arm hinge block and the temple arm; and
    selectably and replaceably removing said temple arm from said temple arm hinge block without the use of tools by application of torque on the temple arm to move the first end of the temple arm from the retaining surface of the temple arm hinge block and to slide the portion of the second end of the temple arm out of the bore.

2. The method of claim 1, wherein the bore is a cylindrical bore.

3. The method of claim 1, wherein the retaining surface is a groove and the first end of the temple arm is positioned in the groove.

4. The method of claim 3, wherein the groove has a forward edge with a depth that is less than half the diameter of the first end of the temple arm.

5. The method of claim 4, wherein the groove is chamfered.

6. The method of claim 4, wherein the forward edge of the groove is beveled and sloped.

7. The method of claim 3, wherein the first end of the temple arm includes a bend, and wherein the groove is angled to accommodate the bend in the first end of the temple arm.

8. The method of claim 1, wherein said eyeglasses are full-wire eyeglasses.

9. The method of claim 1, wherein said eyeglasses are half-wire eyeglasses.

10. The method of claim 1, wherein said eyeglasses are three-piece mount rimless eyeglasses.

11. A method for constructing eyeglasses comprising the steps of:
    providing an eyeglasses assembly having a temple arm hinge block for receiving a temple arm; and
    selectably and removably attaching said temple arm to said temple arm hinge block without the use of tools by positioning a first end of the temple arm on a retaining surface of the temple arm hinge block and by positioning a portion of a second end of the temple arm within a bore of the temple arm hinge block to form a pivotable coupling between the temple arm hinge block and the temple arm, wherein
    the temple arm is configured for replaceable removal from the temple arm hinge block when the temple arm is outwardly flexed and pivoted about the portion of the second end of the temple arm in the bore to move the first end of the temple arm from the retaining surface of the temple arm hinge block and to slide the portion of the second end of the temple arm hinge block out of the bore.

12. The method of claim 11, wherein said eyeglasses are full-wire eyeglasses.

13. The method of claim 11, wherein said eyeglasses are half-wire eyeglasses.

14. The method of claim 11, wherein said eyeglasses are three-piece mount rimless eyeglasses.

15. The method of claim 11, wherein the bore is a cylindrical bore.

16. The method of claim 11, wherein the retaining surface is a groove and first end of the temple arm is positioned in the groove.

17. The method of claim 16, wherein the groove has a forward edge with a depth that is less than half the diameter of the first end of the temple arm.

18. The method of claim 17, wherein the groove is chamfered.

19. The method of claim 17, wherein the forward edge of the groove is beveled and sloped.

20. The method of claim 16, wherein the first end of the temple arm includes a bend, and wherein the groove is angled to accommodate the bend in the first end of the temple arm.

* * * * *